US010871592B2

(12) United States Patent
Barfoot et al.

(10) Patent No.: US 10,871,592 B2
(45) Date of Patent: Dec. 22, 2020

(54) OPTICAL FREQUENCY COMB SOURCE FOR FIBER SENSOR INTERFEROMETER ARRAYS

(71) Applicant: Halliburton Energy Services Inc., Houston, TX (US)

(72) Inventors: Andrew David Barfoot, Houston, TX (US); Han-Sun Choi, Houston, TX (US); Xinwei Lan, Houston, TX (US)

(73) Assignee: Halliburton Energy Services Inc., Houston, TX (US)

( * ) Notice: Subject to any disclaimer, the term of this patent is extended or adjusted under 35 U.S.C. 154(b) by 0 days.

(21) Appl. No.: 15/755,720

(22) PCT Filed: Nov. 30, 2015

(86) PCT No.: PCT/US2015/062968
§ 371 (c)(1),
(2) Date: Feb. 27, 2018

(87) PCT Pub. No.: WO2017/095370
PCT Pub. Date: Jun. 8, 2017

(65) Prior Publication Data
US 2018/0313974 A1 Nov. 1, 2018

(51) Int. Cl.
*G01B 9/02* (2006.01)
*G01V 8/24* (2006.01)
(Continued)

(52) U.S. Cl.
CPC .......... *G01V 8/24* (2013.01); *G01B 9/02027* (2013.01); *G01V 1/40* (2013.01); *G02B 6/29386* (2013.01); *H04B 10/071* (2013.01); *G01V 8/16* (2013.01)

(58) Field of Classification Search
CPC .............. G01D 5/353; G01D 5/35303; G01D 5/35306; G01D 5/35309; G01D 5/35312; G01D 5/35316
See application file for complete search history.

(56) References Cited

U.S. PATENT DOCUMENTS

| 4,653,916 A | 3/1987 | Henning et al. |
| 4,947,037 A | 8/1990 | Nash et al. |

(Continued)

FOREIGN PATENT DOCUMENTS

| EP | 326199 | 8/1989 |
| WO | 9102946 | 3/1991 |

OTHER PUBLICATIONS

Optiphase, Inc., "TDI-7000 TDM Fiber Interrogator", available to the public at http://www.optiphase.com/data_sheets/TDI-7000_Data_Sheet_Rev_D.pdf, Dec. 8, 2011, 2 pages.

(Continued)

*Primary Examiner* — Jonathan M Hansen
(74) *Attorney, Agent, or Firm* — Kilpatrick Townsend & Stockton LLP (57) ABSTRACT

An interrogation system may be coupled to a fiber-optic cable positioned in a wellbore to interrogate a plurality of optical sensors coupled to the fiber-optic cable. The interrogation system may include an optical frequency comb source having a plurality of narrowband optical carriers transmitting light to the plurality of optical sensors. Each of the plurality of optical sensors may include a pair of partial reflectors to reflect the light transmitted by the optical frequency comb to one or more optical receivers to receive the reflection signals In some aspects, the interrogation system may include a de-interleaver device for separating reflected light signals having adjacent wavelength into separate optical waveguides. In additional aspects, interrogation system may also include a data processing system having a (Continued)

processing device for performing interferometric measurements using the reflected light signals.

20 Claims, 8 Drawing Sheets

(51) Int. Cl.
  *G01V 1/40*   (2006.01)
  *G02B 6/293*  (2006.01)
  *H04B 10/071* (2013.01)
  *G01V 8/16*   (2006.01)

(56) References Cited

U.S. PATENT DOCUMENTS

| | | | |
|---|---|---|---|
| 4,956,549 A | 9/1990 | Henning et al. | |
| 5,227,624 A | 7/1993 | Henning et al. | |
| 6,097,487 A * | 8/2000 | Kringlebotn | G01J 9/0246 356/450 |
| 6,233,374 B1 | 5/2001 | Ogle et al. | |
| 6,778,720 B1 * | 8/2004 | Cekorich | G01D 5/35383 356/463 |
| 8,447,155 B1 | 5/2013 | Kuo et al. | |
| 8,451,528 B1 | 5/2013 | Kuo | |
| 8,786,930 B2 | 7/2014 | Kuo | |
| 2003/0142319 A1 * | 7/2003 | Ronnekleiv | G01D 5/35303 356/477 |
| 2004/0216872 A1 * | 11/2004 | Foster | E21B 47/01 166/250.01 |
| 2006/0250274 A1 | 11/2006 | Mombourquette et al. | |
| 2007/0223003 A1 * | 9/2007 | Koste | G01B 11/18 356/478 |
| 2010/0025032 A1 | 2/2010 | Smith et al. | |
| 2011/0098931 A1 * | 4/2011 | Kosmala | E21B 47/00 702/12 |
| 2012/0237205 A1 * | 9/2012 | Duncan | E21B 47/0006 398/25 |
| 2013/0113629 A1 * | 5/2013 | Hartog | G01D 5/35303 340/853.2 |
| 2015/0204186 A1 | 7/2015 | Yang et al. | |

OTHER PUBLICATIONS

International Patent Application No. PCT/US2015/062968, "International Search Report and Written Opinion", Jul. 29, 2016, 11 pages.

* cited by examiner

OPTICAL FREQUENCY COMB SOURCE FOR FIBER SENSOR INTERFEROMETER ARRAYS

TECHNICAL FIELD

The present disclosure relates generally to fiber-optic systems and, more particularly (although not necessarily exclusively), to interrogation methods and systems for fiber sensor interferometer arrays using an optical frequency comb source.

BACKGROUND

Fiber-optic sensor arrays may be used for downhole oil and gas applications. For example, fiber-optic sensor arrays may be used as geophones for sensing ground movement or displacement or hydrophones for sensing sound in underwater environments. A fiber-optic sensor array may be deployed downhole in a wellbore on a fiber-optic cable and interrogated from the surface of the wellbore using an optical light source and a detector device. In some examples, fiber-optic sensor arrays may be deployed having one hundred or more sensors in the array, covering over a kilometer or more of linear distance within the wellbore. Multiplexing these large fiber sensor arrays may include using one or both of time-division multiplexing ("TDM") or wavelength division multiplexing ("WDM"). But, these multiplexing techniques may result in the presence of crosstalk between the sensors as the sensors are interrogated. The crosstalk between the sensors may be significant, particularly when the interrogation methods are applied to a fiber-optic cable having numerous sensors. The cumulative effect of the crosstalk between the sensors may cause the performance of the sensors to be degraded.

Also, the wavelength of light that may be reflected by the array of sensors may be temperature-dependent or strain-dependent. The changes in temperature at various depths of the wellbore or in the strain of the fiber-optic cable may result in a significant and varying shift in the reflectivity spectrum of the partial reflectors making up the sensors to cause misalignments between the sensors and an optical light source affecting the ability of an interrogation system to read the sensors for interferometric measurements.

DETAILED DESCRIPTION

Certain aspects and examples of the present disclosure relate to interrogating optical sensors coupled to a fiber-optic cable using an optical frequency comb source to transmit light to the optical sensors. The optical frequency comb source may be a discrete device having multiple, evenly spaced wavelength carriers to transmit light from a single light source to interrogate the optical sensor array coupled to the fiber-optic cable. Each optical sensor may include a pair of partial reflectors that may reflect the light transmitted by the optical frequency comb to an optical receiver. The optical receiver may convert the reflected light signals received from the optical sensors into electrical signals for interferometric processing by a data processing system.

In some aspects, the interrogation system may include a delay fiber having a length to delay a light signal reflected by the optical frequency comb in reaching the optical sensors. The delay length may be sized to allow the delayed light signal to reach a partial reflector of a sensor at the same time as a reflection light signal reflected by a second partial reflector of the sensor corresponding to a light signal that was not delayed by the delay fiber. The light reflected from the first partial reflector and the second partial reflector of the sensor may travel together to the optical receivers such that they arrive at the same time. In additional aspects, a de-interleaver device may be positioned in the receiver section of the interrogation system between the optical sensors and the optical receivers to receive the reflection light signals. The de-interleaver device may separate the light signals received and route them to different optical receivers based on a wavelength carrier associated with the reflection light signals to prevent crosstalk between reflection light signals having adjacent wavelength carriers.

Using an optical frequency comb source according to some aspects may allow an interrogation system to have a large number of optical sensors while limiting the effect of cumulative crosstalk between the reflection light signals reflected from each of the sensors. In some aspects, using an optical frequency comb source over alternative light sources (e.g., a bank of discrete lasers) may increase the number of sensors in an interrogation sensor by a factor of ten without additional crosstalk. Further, replacing discrete lasers with an optical frequency comb source may result in cost-savings and efficiency as each laser would require separate installation, configuration, thermal controls, and power supply to include a unique wavelength carrier. The optical frequency comb source may provide evenly spaced wavelength carriers on a single device operable from a single light source.

Tight spacing of the wavelength carriers in an optical frequency comb source may allow each optical sensor on a fiber-optic cable positioned in a wellbore to be interrogated by the optical frequency comb source regardless of a shift in the reflectivity spectrum corresponding to a partial reflector of an optical sensor. For example, the reflectivity spectrum corresponding to the pair of partial reflectors making up a sensor may shift depending on a temperature of the optical sensors or a strain in the fiber-optic cable to which the optical sensors are attached. For example, as the sensors are positioned downhole in the wellbore, the temperature surrounding the sensors at various depths may significantly vary (e.g., 20 degrees proximate to the surface of the wellbore and approaching 200 degrees at the bottom of the wellbore). Additionally, in a deviated wellbore, horizontal sections may exist having largely uniform temperatures equal to the temperature at the lowest depth of the vertical section of the wellbore. Although the temperature may be consistent in this section of the wellbore, the strain on the sensors may vary with the curvature of the fiber-optic cable (e.g., static strain may change as the cable makes a gradual 90 degree turn at a heel section of the deviated wellbore). But, the wavelength carriers of an optical frequency comb according to some aspects of the present disclosure may be spaced such that a shift in the reflectivity spectrum away from one wavelength carrier may cause the optical sensor to engage an adjacent wavelength carrier to interrogate the optical sensor. In this manner, the interrogation system may ensure that each sensor is effectively interrogated without requiring additional monitoring and calculations to track temperature and measurement to anticipate the shifts in the reflectivity spectrum during operation of the interrogation system.

Figure 1:
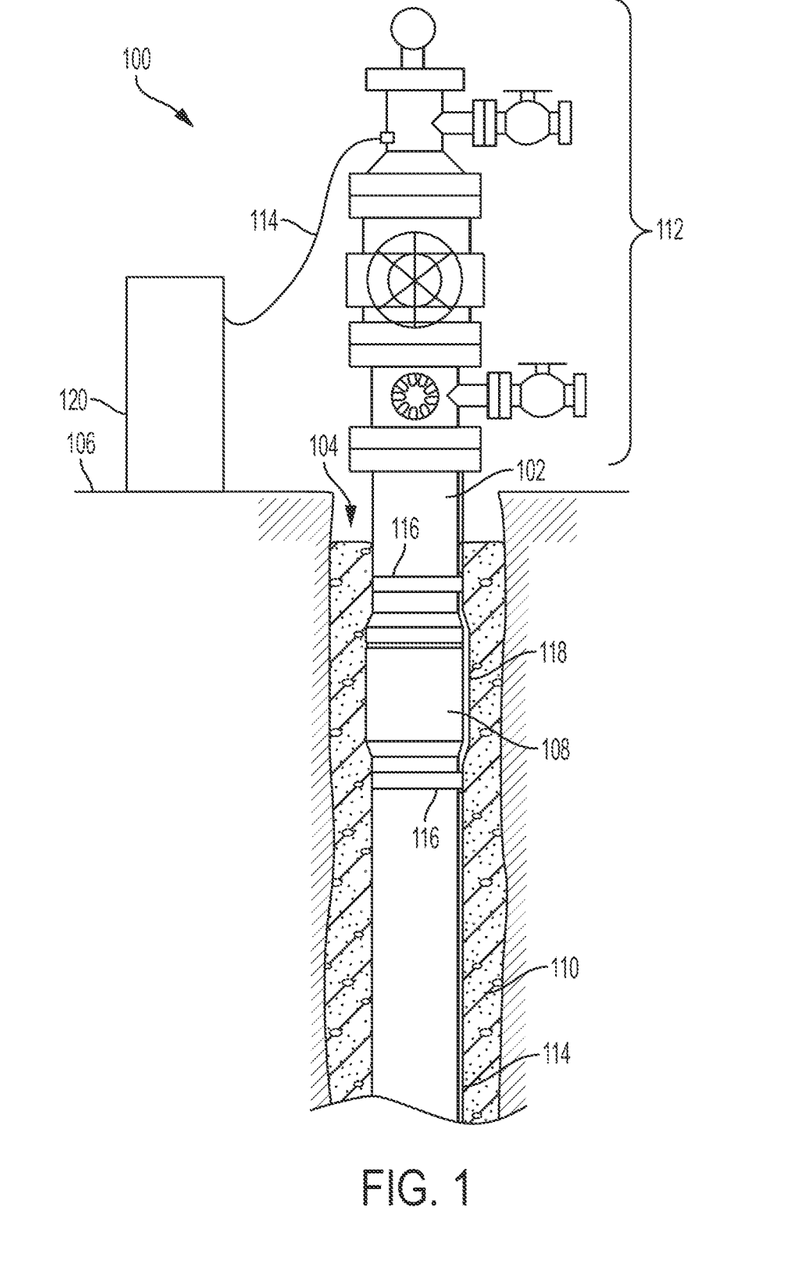
FIG. 1 is a cross-sectional schematic diagram depicting a wellbore environment that may include an interrogation system according to one aspect of the present disclosure.

Various aspects of the present disclosure may be implemented in various environments. FIG. 1 illustrates a non-limiting example of a wellbore environment 100 that may include an interrogation system according to some aspects of the present disclosure. The wellbore environment 100 may include a casing string 102 positioned in a wellbore 104 that has been formed in a surface 106 of the earth. The wellbore environment 100 may have been constructed and completed in any suitable manner, such as by use of a drilling assembly having a drill bit for creating the wellbore 104. The casing string 102 may include tubular casing sections connected by end-to-end couplings 108. In some aspects, the casing string 102 may be made of a suitable material such as steel. Within the wellbore 104, cement 110 may be injected and allowed to set between an outer surface of the casing string 102 and an inner surface of the wellbore 104. At the surface 106 of the wellbore 104, a tree assembly 112 (also known as a "Christmas tree") may be joined to the casing string 102. The tree assembly 112 may include an assembly of valves, spools, fittings, etc. to direct and control the flow of fluid (e.g., oil, gas) into or out of the wellbore 104 within the casing string 102.

Fiber-optic cables 114 may be routed through one or more ports in the tree assembly 112 and extend along an outer surface of the casing string 102. In some aspects, at least one of the fiber-optic cables 114 may include an array of optical sensors along the fiber-optic cable 114. The sensors may be deployed in the wellbore 104 and used to sense and transmit measurements of downhole conditions in the wellbore environment 100 to the surface 106. The fiber-optic cables 114 may be held against the outer surface of the casing string 102 at intervals by coupling bands 116 that extend around the casing string 102. A protective covering 118 may be installed over the fiber-optic cables 114 at the coupling 108 of the casing string and may be held in place by at least two of the coupling bands 116 installed on either side of the couplings 108. In some aspects, the fiber optic cable 114 may be lowered into the wellbore 104 temporarily in the form of a wireline or a slickline cable. In some aspects of the present disclosure, the fiber-optic cable 114 may be coupled to an interrogation system 120 at the surface 106 of the wellbore 104. The interrogation system 120 may be an opto-electronic unit that may include devices and components to interrogate sensors coupled to the fiber-optic cables 114. In some aspects, the interrogation system 120 may be configured to transmit light through one or more of the fiber-optic cables 114 to the sensors. The interrogation system 120 may also receive and perform interferometric measurements of reflected light from the sensors coupled to the fiber-optic cables.

Figure 2:
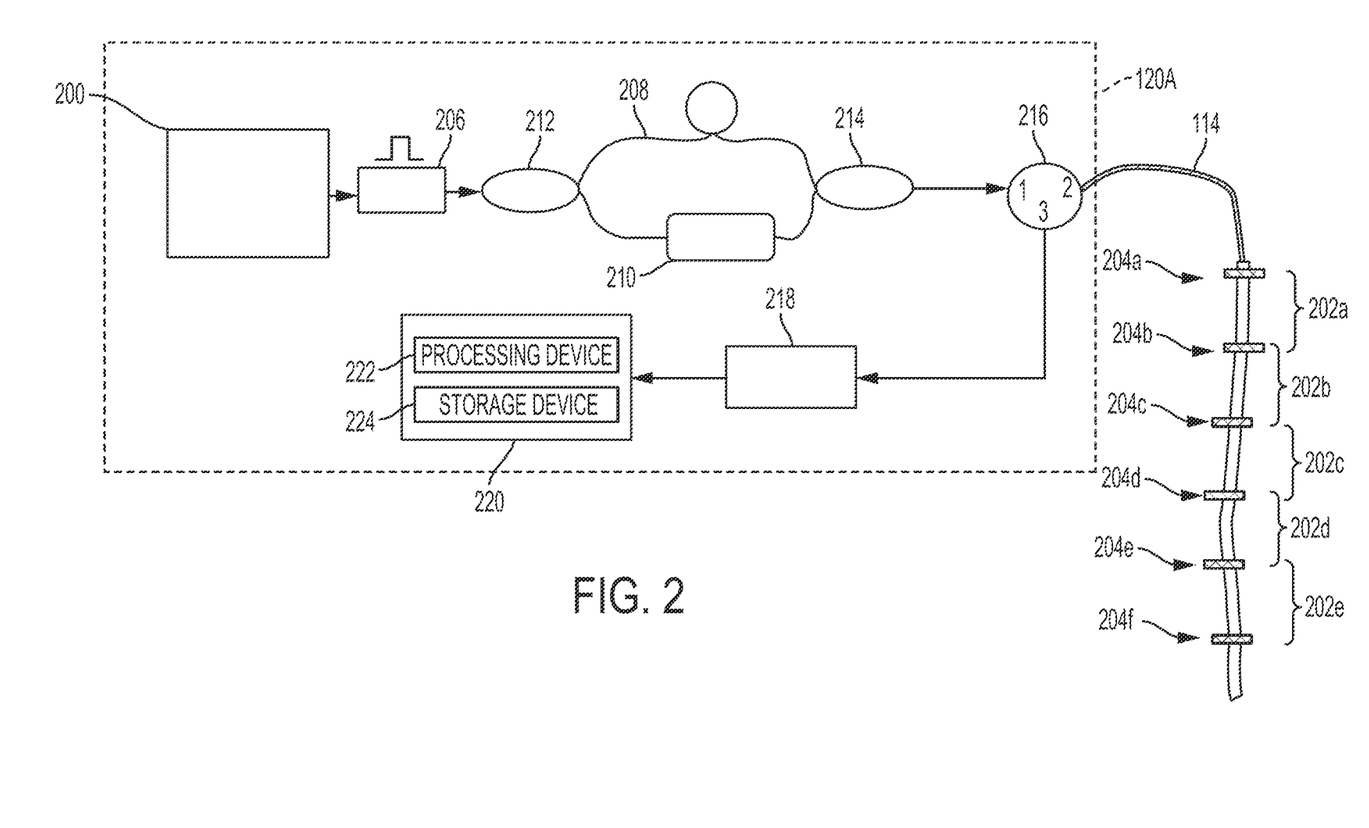
FIG. 2 is a schematic diagram of an example of an interrogation system using an optical frequency comb according to one aspect of the present disclosure.

FIG. 2 shows a schematic view of an example of an interrogation system 120A including an optical frequency comb source 200 that may be used to transmit light along the fiber-optic cable 114 according to an aspect of the present disclosure. In some aspects, the interrogation system 120 may be positioned proximate to the wellbore 104 as shown by interrogation system 120 in FIG. 1. The optical frequency comb source 200 may be a discrete device wherein a light signal consisting of two or more narrowband optical seed carriers mix in a non-linear optical medium to generate a comb of optical frequencies in the non-linear medium. The spacing between adjacent comb frequencies may be equal to the difference in the optical frequency of the seed carriers. A non-limiting example may include the TeraTone Low Noise Frequency Comb of RAM Photonics. In some aspects, the optical frequency comb source 200 may include an evenly spaced grid of wavelength carriers that emits light from the light source along an optical spectrum of wavelengths. In some aspects, the optical frequency comb source 200 may replace a number of discrete light sources (e.g., a laser bank) having different wavelength carriers. In some aspects, the optical frequency comb source 200 may be configured to include over 100 wavelength carriers. In one example, the wavelength carriers may be equally spaced apart with an optical frequency spacing between wavelengths that may be configured from approximately 25 GHz and up to approximately 400 GHz, although other ranges may be included without departing from the scope of the present disclosure. In some aspects, the wavelength carriers may be narrowband sources having low phase noise and an optical spectrum linewidth suitable for phase sensitive measurements (e.g., less than 10 kHz).

The light emitted from the optical frequency comb source 200 may be transmitted to an array of optical sensors 202a-202e coupled to at least one of the fiber-optic cables 114. In some aspects, the sensors 202a-202e may be configured to measure or otherwise sense vibrations or dynamic stain affecting the fiber-optic cable 114. The vibrations and strain measured by the sensors 202a-202e may correspond to a condition of the environment in which the sensors 202a-202e reside (e.g., an environment of the wellbore 104 of FIG. 1). In additional and alternative aspects, the sensors 202a-202e may measure parameters, such as temperature, electrical or magnetic fields, radiation, chemical presence or concentration, etc., that may be converted to optical phase through a transducer coupled to the sensors 202a-202e. The sensors 202a-202e may include partially reflective elements (e.g., partial reflectors 204a-204f) that make up each sensor 202a-202e. In some aspects, the sensors 202a-202e are made up of two partial reflectors 204a-204f. For example, sensor 202a includes partial reflectors 204a, 204b, sensor 202b includes partial reflectors 204b, 204c, sensor 202c includes partial reflectors 204c, 204d, sensor 202d includes partial reflectors 204d, 204e, and sensor 202e includes partial reflectors 204e, 204f. In some aspects, the partial reflectors 204a-204f may include a refractive index change or modulation with the fiber-optic cable 114 (e.g., a fiber Bragg grating) or a weak reflector inscribed on the fiber-optic cable 114 by a full spectrum laser or an excimer laser. In additional and alternative elements, the partial reflectors 204a-204f may include reflective sensor elements external to the fiber-optic cable 114 (e.g., a mirror). In some examples, the reflective sensor elements external to the fiber-optic cable 114 may be formed by gold mirrors, fiber Bragg gratings, Faraday rotator mirrors, or other suitable materials. For a fiber Bragg grating array of partial reflectors 204a-204f, the partial reflectors 204a-204f may be separated, by reflectivity spectrum, into groups that are aligned with an interrogation wavelength. For example, where an interrogation system includes four lasers to interrogate an array of 24 fiber Bragg gratings, there may be four fiber Bragg grating designs with six fiber Bragg gratings for each of the reflectivity spectrums. Each spectrum may be centered at a wavelength of one of the four optical sources.

Although five sensors 202a-202e are shown in FIG. 2, any number of optical sensors, including one, may be coupled to the fiber-optic cable 114. In some examples, the optical fiber between two partial reflectors of a sensor 202a-202e may be wrapped around a deformable mandrel to enhance the sensitivity of the sensor 202a-202e. In some examples, the optical fiber between two partial reflectors may be deployed in a spiral pattern to change the directional sensitivity to vibration. In further examples, the fiber-optic cable 114 may include hundreds of sensors per kilometer of optical fiber.

The interrogation system 120A includes a pulser device 206, a delay fiber 208, and an optical modulator 210. In some aspects, the pulser device 206, the delay fiber 208, and the optical modulator 210 may manipulate the light emitted from the optical frequency comb source 200 to interrogate the array of optical sensors. The pulser device 206 may include an opto-electrical device acting as a high-speed shutter or optical switch to generate short pulses (e.g., 200 ns or less) of light using the light emitted by the optical frequency comb source 200. In some aspects, the pulser device 206 may include one or more amplifiers, oscillators, or other suitable components to manipulate the light received from the optical frequency comb source 200 and to generate electromagnetic pulses at a controlled time duration. For example, the pulse may be a short pulse of light having time duration of less than one microsecond based on the configuration and operation of the interrogation system 120A. The pulses of light generated by the pulser device 206 may be output to a delay fiber 208 and an optical modulator 210.

The pulses may be transmitted to the delay fiber 208 and the optical modulator 210 separately using a splitter device 212 to separate the pulses into two pulse signals. The delay fiber 208 may include a portion of optical fiber that may be looped or otherwise manipulated to cause a delay in the time that the light traversing the delay fiber 208 may arrive at the fiber-optic cables 114 and the sensors 202a-202e. In some aspects, length of the delay fiber 208 may be proportional to the width of the sensors 202a-202e (e.g., the width from partial reflector 204a to partial reflector 204b defining the width of sensor 202a). For example, the delay fiber 208 may include a length that is twice the length of the sensor 202a (e.g., the spacing between partial reflectors 204a, 204b) to delay a pulse of light received from the pulser device 206. The delay may cause the pulse of light to reach the partial reflector 204a in the same time that it takes for a pulse of light traversing the path of the optical modulator 210 to reach the partial reflector 204b and for a corresponding light reflected from the partial reflector 204b to travel back to partial reflector 204a. In this manner, the delayed pulse and the light signals reflected from partial reflector 204b may arrive at partial reflector 204a at the same time and travel together to a receiver section of the interrogation system 120A.

The optical modulator 210 may be an electro-optic device having an element exhibiting an electro-optic or acousto-optic effect to modulate the phase or frequency of the light passing through it. In some aspects, the optical modulator 210 may include lead zirconate titanate (PZT) fiber coil that may modulate the path. The optical modulator 210 may modulate a pulse received from the pulser device 206 via the splitter device 212 in response to the change in the element of the optical modulator 210. In some aspects, the optical modulator 210 may modulate an optical phase of the pulse of light. In other aspects, the optical modulator 210 may modulate the polarization direction of the pulse. The pulse received from the delay fiber 208 may be combined with the modulated pulse received from the optical modulator 210 by a combiner device 214 positioned between the pulser device 206 and the fiber-optic cable 114 to transmit pulses from both paths to the sensors 202a-202e using a circulator device 216.

The circulator device 216 may be a coupling device having three ports for passing power unidirectionally in a circular manner. The circulator device 216 may be coupled to the optical frequency comb source 200 at a first port via the light signal path including the pulser device 206, the splitter device 212, the delay fiber 208, the optical modulator 210, and the combiner device 214. In some aspects, the circulator device 216 may be directly coupled to the combiner device 214 to receive the combined pulses from the delay fiber 208 and the optical modulator 210 as shown in FIG. 2. The circulator device 216 may be coupled to the sensors 202a-202e via the fiber-optic cables 114 at a second port of the circulator device 216. The circulator device 216 may be coupled to a receiver section of the interrogation system 120A having one or more optical receivers 218 at a third port of the circulator device 216. In this configuration, the circulator device 216 may pass light emitted by the optical frequency comb source 200 to the sensors 202a-202e coupled to the fiber-optical cable via the first and second ports of the circulator device 216. The circulator device 216 may pass light reflected from the partial reflectors 204a-204f of the sensors 202a-202e to the optical receivers 218 via the second and third ports of the circulator device, respectively. The unidirectional nature of the circulator device 216 may prevent reflected light from the partial reflectors 204a-204f from reflecting back toward the optical frequency comb source 200. The optical receivers 218 shown in FIG. 2 may represent a single optical receiver or multiple optical receivers 218 for receiving light signals reflected from the partial reflectors 204a-204f of the sensors 202a-202e. The optical receivers 218 may include opto-electrical devices having one or more photodetectors to convert the light signals reflected from the partial reflectors 204a-204f into electricity using a photoelectric effect. In some aspects, the photodetectors of the optical receivers 218 may include photodiodes to absorb photons of the light reflected from the sensors 202a-202e and convert the reflected light into an electrical current.

The optical receivers 218 may be coupled to an analog-to-digital converter as part of a digital data processing system 220. In some aspects, the electrical signals generated by the optical receivers 218 may be transmitted to the data processing system 220 to demodulate optical phase information for extracting information about the conditions of the wellbore 104 at the position of the sensors 202a-202e. Although the data processing system 220 is shown separate from the optical receivers 118, in some aspects, an optical receiver 118 and the data processing system 220 may be a single device. The data processing system 220 may include a processing device 222 and a data storage device 224. The processing device 222 may include a single processing device or multiple processing devices. Non-limiting examples of the processing device 222 may include a microprocessor, an application-specific integrated circuit ("ASIC"), a field-programmable gate array ("FPGA"), etc. The data storage device 224 may be coupled to the processing device 222. In some aspects, the data storage device 224 may include a non-volatile memory device that retains stored information (e.g., rotating magnetic storage media, electrically erasable and programmable read-only memory ("EEPROM"), a flash memory, or any other type of non-volatile memory, etc.). In additional and alternative aspects, the data storage device 224 may include a medium from which the processing device 222 may read instructions or other stored information for performing the interferometric measurements by processing light signals reflected from the sensors 202a-202e. For example, the data storage device 224 may also record values obtained from performing optical phase measurements based on the light reflected from the partial reflectors 204a-204f corresponding to the modulated light signals generated by the optical modulator 210.

In some aspects, the interrogation system 120A may be configured to interrogate the sensors 202a-202e using a pulse modulation interrogation scheme as shown in FIG. 2. The interrogation system 120A may interrogate the sensors 202a-202e using a first pulse transmitted by the pulser device 206 via the delay fiber 208 and a second pulse transmitted by the pulser device 206 via the optical modulator 210. Light signals corresponding to the pulses may be reflected by one or more of the sensors 202a-202e and may be transmitted to the optical receivers 218 via the circulator device 216. For example, a first light signal corresponding to the first pulse may be reflected from partial reflector 204a of sensor 202a and a second light signal corresponding to the second pulse may be reflected from partial reflector 204b of sensor 202b. In some aspects, the delay fiber 208 may cause a delay in one of the pulses to allow the light signals reflected from the partial reflectors 204a, 204b to arrive at the optical receivers 218 at the same time creating an interference between the light signals. In additional aspects, the optical receiver 218 may measure the combined light signals to generate an interference signal that may be routed to the processing device 222 of the data processing system 220. In some aspects, the processing device 222 may perform interferometric measurements on the interference signal using instructions stored in the data storage device 224. For example, the data storage device may include instructions for causing the processing device 222 to perform optical phase measurements using known methods (e.g., dual-slope phase demodulation, optical heterodyne phase demodulation).

Figure 3:
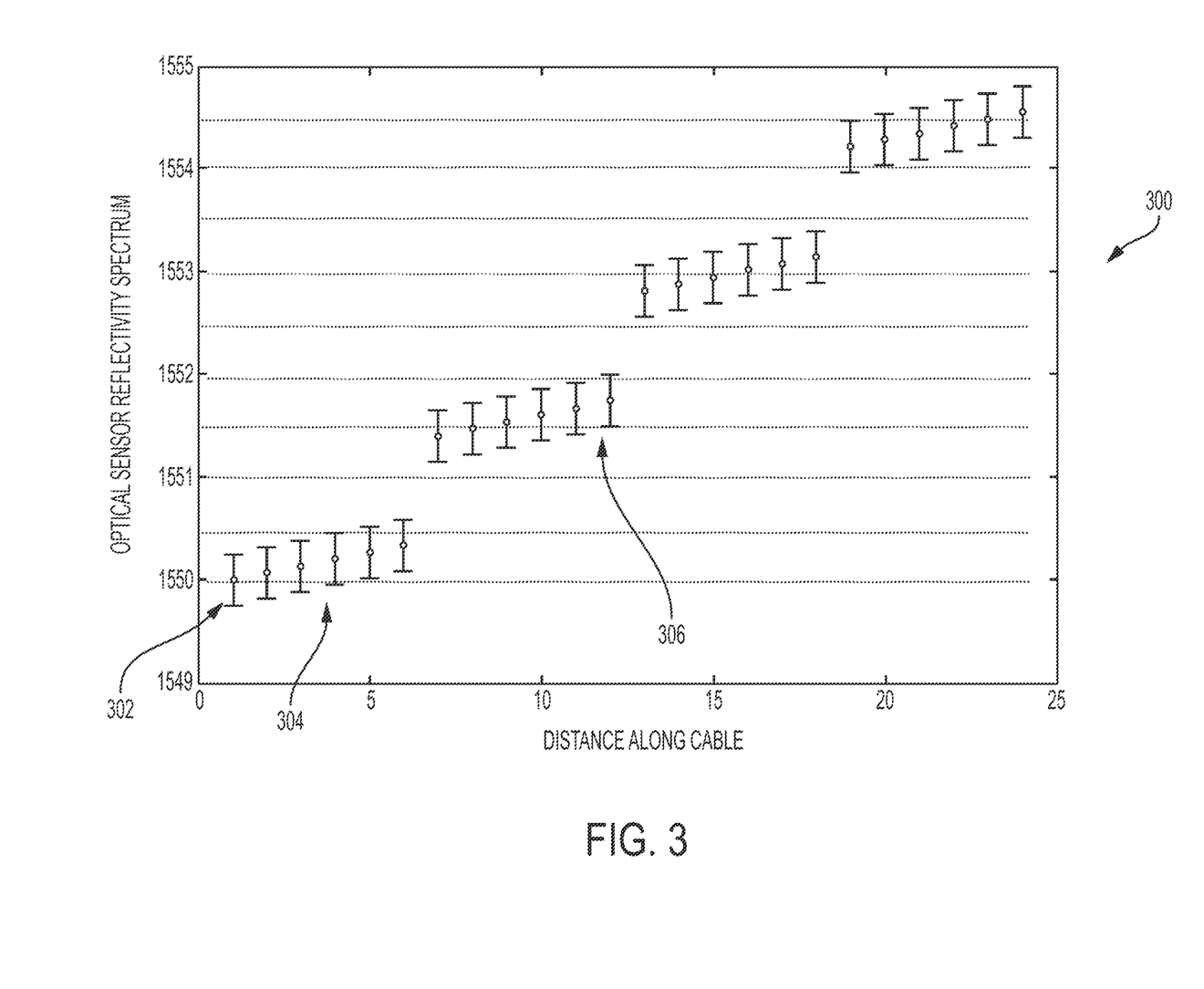
FIG. 3 is a graphical diagram of an example of spectra for partial reflectors of optical sensors along a length of fiber-optic cable according to one aspect of the present disclosure.

FIG. 3 is a graphical view of an example of a spectrum of the partial reflectors 204a-204f making up optical sensors 202a-202e shown in FIG. 2 along the fiber-optic cable 114. In some aspects, the sensors 202a-202e may include fiber Bragg grating partial reflectors. In some aspects, the optical spectrum may be measured in nanometers and shown on the vertical axis of the graph. The horizontal axis of the graph indicates the distance along the fiber-optic cable 114 and may be measured in meters. Each symbol 302 may represent a partial reflector 204a-204f of an optical sensor 202a-202e positioned every meter along the fiber-optic cable 114. The symbol 302 indicates that a partial reflector of a first optical sensor positioned at a first meter of the fiber-optic cable 114 (e.g., partial reflector 204a) may include a spectrum centered at approximately 1550 nanometers and having a spectrum full-width at half maximum ("FWHM") of approximately 500 picometers. In some aspects, the reflectivity spectrum of each partial reflectors 204a-204f may allow for a low noise sensor reading. For example, the strain and temperature along the fiber-optic cable 114 may be uniform to allow each optical source to effectively interrogate five sensors. In other aspects, there may be deviations in the reflectivity spectrum of each partial reflector 204a-204f, as shown in the graph of FIG. 3. The deviations may be due to the environment in which the sensors 202a-202e the temperature of the environment in which the sensors are positioned or the strain placed on the fiber-optic cable 114 proximate to the sensors 202a-202e. For example, the sensors 202a-202e may be temperature-dependent sensors or strain-dependent such that the reflectivity spectrum may shift in response to a change in temperature or strain.

In some aspects, the dotted horizontal lines extending from the vertical axis may represent wavelength carriers emitted by the optical frequency comb source 200. The wavelength carriers are spaced evenly every 500 picometers. The spectrum of the partial reflectors 204a-204f and the spacing of the wavelength carriers of the optical frequency comb source 200 are close enough to allow a wavelength carrier to engage each sensor 202a-202e in the fiber-optic cable 114. Thus, a shift in the reflectivity spectrum in response to temperature or strain variations or variations in strain on the fiber-optic cable 114 may not affect the optical frequency comb source 200 from engaging the sensors 202a-202e. Light may be reflected from the sensors 202a-202e via the partial reflectors 204a-204f in response to a wavelength carrier engaging the sensor 202a-202e as described above with respect to FIG. 2 for a low-noise sensor reading by the data processing system 220. In some aspects, the sensors 202a-202e may include partial reflectors 204a-204f having a spectrum that engages more than one wavelength carrier of the optical frequency comb source 200 as shown by symbols 304, 306.

Figure 4:
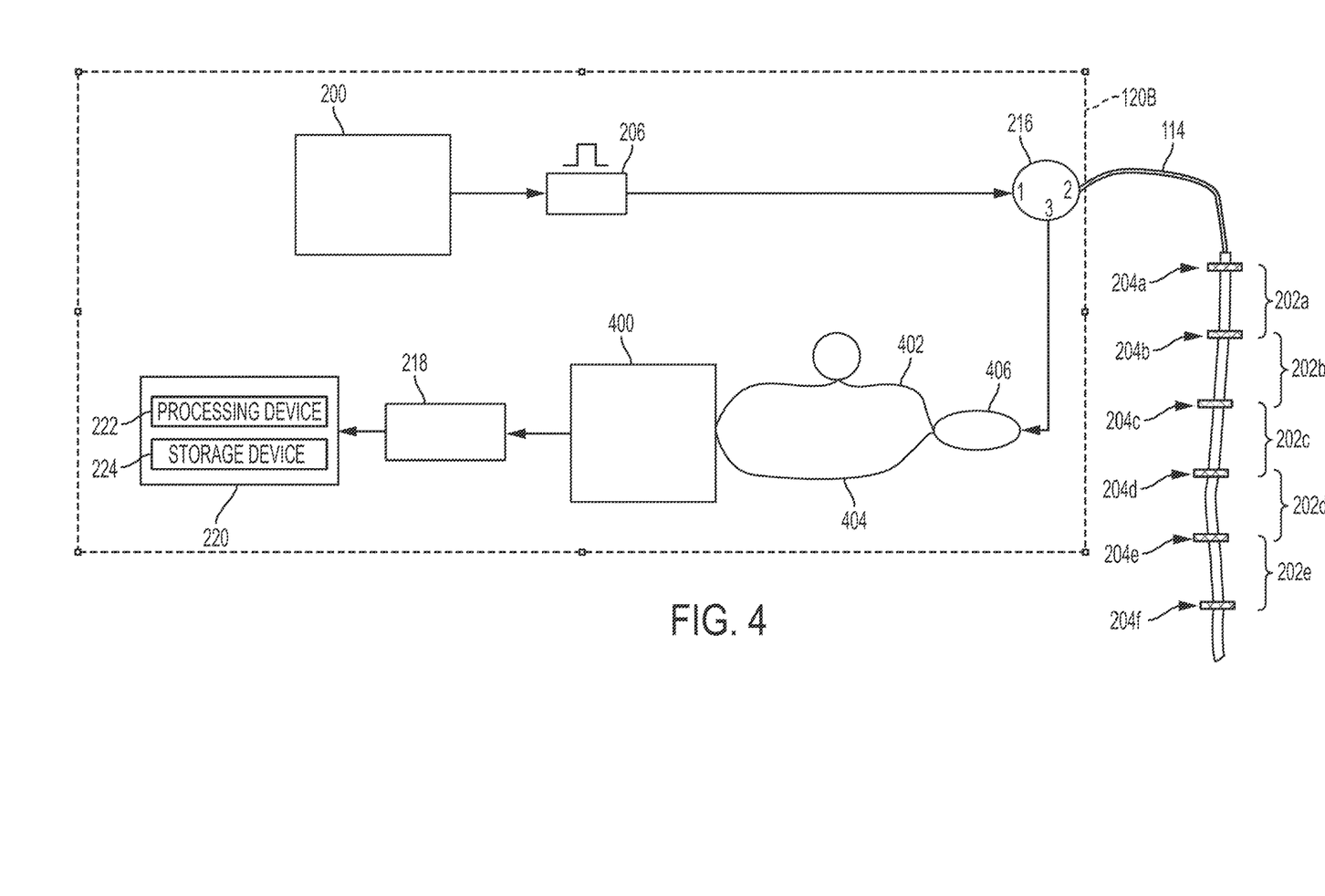
FIG. 4 is a schematic diagram of an example of an interrogation system using the optical frequency comb and an optical mixer according to one aspect of the present disclosure.

FIG. 4 is a schematic diagram of an interrogation system 120B that may use the optical frequency comb source 200 according to an aspect of the present disclosure. In some aspects, the interrogation system 120 may be a modification or alternative to the interrogation system 120A described in FIG. 2. The interrogation system 120B includes the optical frequency comb source 200 coupled to the pulser device 206. The pulser device 206 may generate a single pulse to interrogate the sensors 202a-202e. Light reflected from the partial reflectors 204a-204f of the sensors 202a-202e in response to the pulse may be routed by the circulator device 216 to the optical receivers 218 via an optical mixer 400. The optical mixer 400 may include a coupler (e.g., a 2×2 coupler, a 3×3 coupler, a 4×4 coupler), an optical hybrid, or any suitable passive optical mixer to provide optical interferometric outputs. In some aspects, the optical mixer 400 may include one or more components (e.g., diodes, transistors, crystals, oscillators, amplifiers, etc.) for combining the reflected light signals received from the partial reflectors 204a-204f to generate a combined signal. The combined signal may be combined by the optical mixer 400 to permit determining the optical phase difference between the reflection signals forming the combined signals by the data processing system 220.

The optical mixer 400 may be coupled to a longer delay fiber 402 and an additional, shorter fiber 404 having less delay. The reflection signals from the partial reflectors 204a-204f of the sensors 202a-202e may be transmitted by the circulator device 216 to a splitter device 406 that may route a first reflection signal to the delay fiber 402 and a second reflection signal to the additional fiber 404. The delay fiber 402 may include a length to delay the first reflection signal such that it arrives at the optical mixer 400 at the same time as the second reflective signal. In some aspects, one of the delay fiber 402 or the additional fiber 404 may include an optical modulator that may modulate the reflection signal traversing the delay fiber 402 or the additional fiber 404 prior to the reflection signals being received at the optical mixer. The optical mixer 400 may combine the first reflection signal and the second reflective signal to generate an interference signal that may be transmitted to the data processing system 220 for interferometric processing (e.g. demodulation) by the processing device 222 based on instructions stored in the data storage device 224 as described above with respect to FIG. 2.

Figure 5:
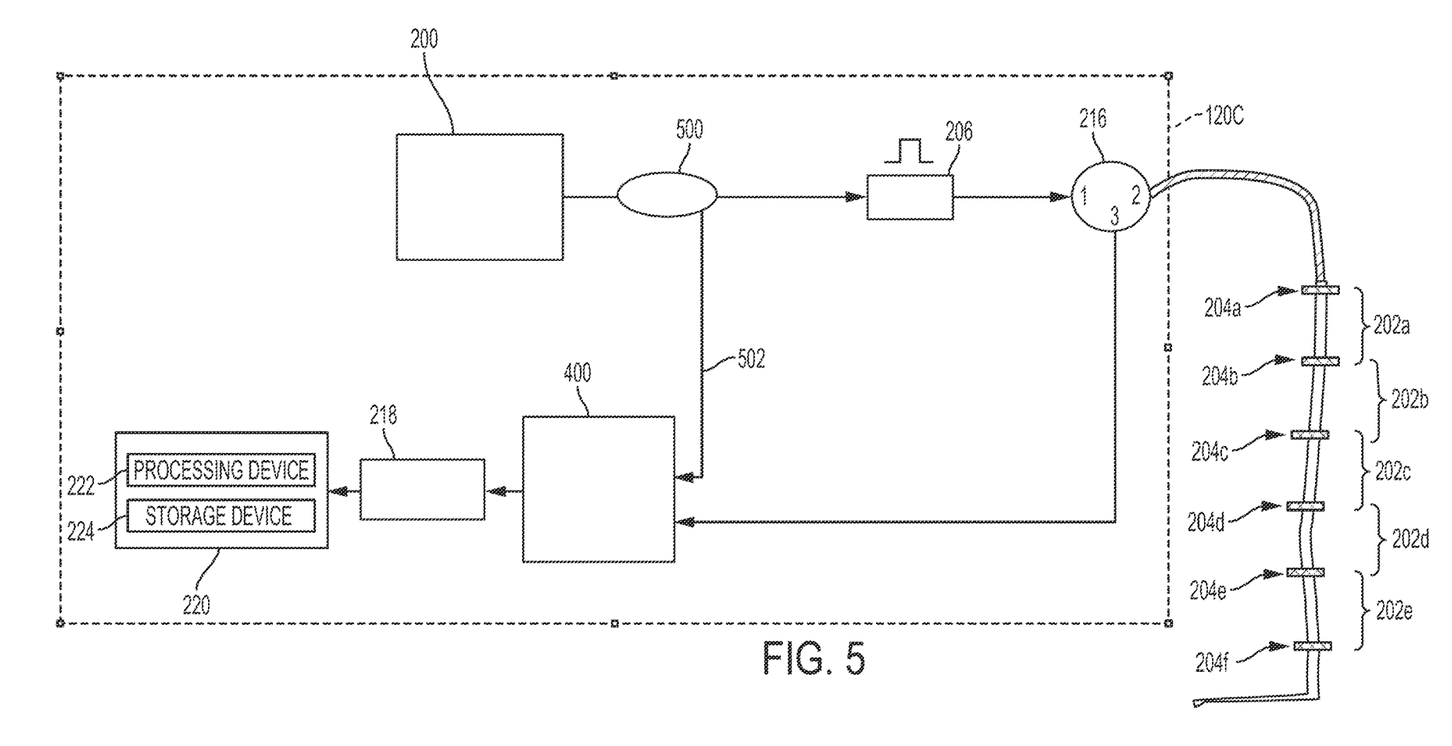
FIG. 5 is a schematic diagram of an example of an interrogation system using the optical frequency comb with a reference light source according to one aspect of the present disclosure.

FIG. 5 is a schematic diagram of an interrogation system 120C that may use the optical frequency comb source 200 according to an aspect of the present disclosure. In some aspects, the interrogation system 120 may be a modification or alternative to the interrogation systems 120A or 120B described in FIG. 2 or FIG. 3, respectively. The interrogation system 120C includes the optical frequency comb source 200 coupled to the pulser device 206. Similar to the interrogation system 120B of FIG. 4, the pulser device may generate a single pulse to interrogate the sensors 202a-202e coupled to the fiber-optic cable 114. Light reflected from the partial reflectors 204a-204f of the sensors 202a-202e may be routed by the circulator device 216 to the optical receivers 218 via the optical mixer 400. A splitter device 500 may be positioned between the optical frequency comb source 200 and the pulser device 206. The splitter device 500 may split the light emitted from the optical frequency comb source 200 such that a light signal is transmitted to the pulser device 206 and a reference light signal is transmitted directly to the optical mixer 400 via a reference signal path 502.

The optical mixer 400 may be configured to mix or otherwise combine the reference light signal and a light signal reflected from the sensors 202a-202e via a partial reflector 204a-204f. In this manner, the reference light signal and the light signal reflected from the sensors 202a-202e may arrive at the optical mixer at the same time. The optical mixer 400 may combine the signals to create an interference signal. In some aspects, the reference light signal may include the same optical frequency as the reflected light signal to create an interference signal that is a homodyne signal. In other aspects, the optical mixer 400 may be configured to shift the frequency of the reference light signal relative to the reflected light signal to generate an interference signal that is heterodyne signal having a beat frequency equal to the frequency of the separation of the two light signals being combined. The interference signal may be transmitted to the data processing system 220 for further processing by the processing device 222. In some aspects, the interference signals routed to the data processing system 220 may be stored in the data storage device 224. The processing device 222 may process interferometric measurements using reflection signals from different partial reflectors 204a-204f of the sensors 202a-202e. For example, the demodulated phase from any pair of partial reflectors 204a-204f may be subtracted by the processing device 222 to determine changes in the fiber strain between the pair of partial reflectors 204a-204f.

In some aspects, the interrogation schemes using the interrogation systems 120A, 120B, 120C described in FIGS. 2, 4, and 5, respectively, may experience crosstalk noise between adjacent light emitted from adjacent wavelength carriers of the optical frequency comb source 200. For example, the wavelength carriers of the optical frequency comb source 200 may be spaced such that the reflectivity spectrum of the partial reflectors 204a-204f overlap multiple wavelengths. Referring back to FIG. 3, symbols 304, 306 may represent such partial reflectors overlapping multiple wavelengths of light emitted by the optical frequency comb source 200. For example, the reflectivity spectrum of the partial reflector represented by symbol 304 may overlap with the wavelength carrier emitting light at 1550 nanometers and the wavelength carrier emitting light at 1550.5 nanometers. In some aspects, one or more additional devices may be included in the interrogation systems 120A, 120B, 120C described in FIGS. 2, 4, and 5, respectively to prevent the crosstalk noise caused by the tight spacing of the wavelength carriers of the optical frequency comb source 200 and the spectrum full-width at half maximum of the partial reflectors 204a-204f.

Figure 6:
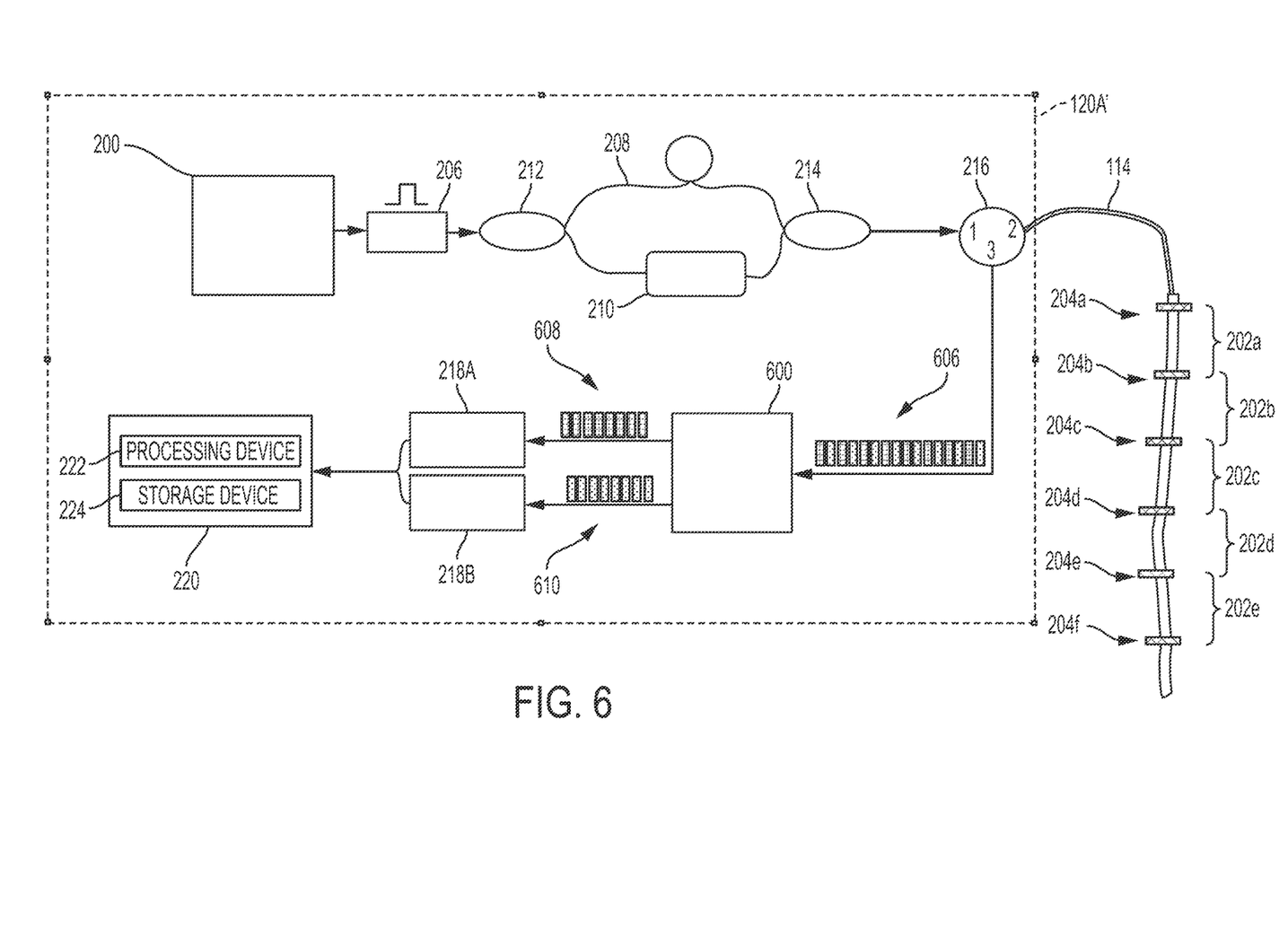
FIG. 6 is a schematic diagram of an example of the interrogation system of FIG. 2 using a de-interleaver device according to one aspect of the present disclosure.

FIG. 6 is a schematic diagram of an interrogation system 120A' including a de-interleaver device 600. The interrogation system 120A' may include the same configuration as the interrogation system 120A shown in FIG. 2, but may include the de-interleaver device 600 to prevent crosstalk noise between adjacent wavelength carriers. The interrogation system 120A' includes the optical frequency comb source 200 coupled to the pulser device 206. A pulse generated by the pulser device 206 may be split into a pair of pulses by the splitter device 212 and applied to one of the delay fiber 208 or the optical modulator 210 as described with respect to the interrogation system 120A of FIG. 2. The pulse delayed by the delay fiber 208 and the pulse modulated by the optical modulator 210 may be applied to the fiber-optic cable 114 via the combiner device 214 and the circulator device 216 to interrogate the sensors 202a-202e. The de-interleaver device 600 may be positioned between the circulator device 216 and optical receivers 218a, 218b to receive the reflected light from the sensors 202a-202e. In some aspects, optical receivers 218a, 218b may include two of (or two sets of) the optical receivers 218 shown in FIG. 2. Light reflected from the partial reflectors 204a-204f of the sensors 202a-202e may be routed by the circulator device 216 to the optical receivers 218a, 218b via the de-interleaver device 600.

The de-interleaver device 600 may include an optical device having three ports for receiving multiplexed reflected light signals and separating the light signals into two separate wavelength bands. For example, light signals 606 received by the de-interleaver device 600 may include light signals having multiple wavelengths. The de-interleaver device 600 may separate light signals 606 having adjacently-spaced wavelengths into a first set of light signals 608 and a second set of light signals 610. In some aspects, the first set of light signals 608 may include an odd channel of wavelengths (e.g., the first wavelength, the third wavelength, etc.) and the second set of light signals 610 may include an even channel of wavelengths (e.g., the second wavelength, the fourth wavelength, etc.). The first set of light signals 608 may be routed to optical receivers 218a. The second set of light signals 610 may be routed to different optical receivers 218b.

In some aspects, additional de-interleaving stages may be employed by the de-interleaver device 600 without departing from the scope of the present disclosure. For example, a second de-interleaving stage may be employed after the first stage to further separate adjacently-spaced wavelengths to a third and fourth set of optical receivers (not shown). The de-interleaver device 600 may be a dual stage de-interleaver device and may route a first set of wavelengths (e.g., wavelengths 1, 5, 9, 13, etc.) to the optical receivers 218a, a second set of wavelengths (e.g., wavelengths 2, 6, 10, 14, etc.) to the optical receivers 218b, a third set of wavelengths (e.g., wavelengths 3, 7, 11, 15, etc.) to the third set of optical receivers, and a fourth set of wavelengths (e.g., wavelengths 4, 8, 12, 16, etc.) to the fourth set of optical receivers. In some aspects, the de-interleaver device 600 may reduce the intensity of the coherent Raleigh backscatter noise from the sensors 202a-202e by a factor of two or four (or more depending on the number of de-interleaver stages of the de-interleaver device 600). In some aspects, the de-interleaver device 600 may be replaced with a combination of a wavelength demultiplexer and a group of wavelength multiplexers that may, together, achieve the same effect. For example, a demultiplexer may be used to separate the wavelengths of received light and the multiplexers (coupled by fiber couplers) may be used to regroup the separated light into different light outputs with required wavelength combinations.

Although the de-interleaver device 600 is described in interrogation system 120A' as an additional device that may be included in the interrogation system 120A of FIG. 2, the de-interleaver device 600 may be similarly added to the interrogation systems 120B or 120C of FIGS. 4 and 5, respectively, without departing from the scope of the present disclosure. Further, a de-interleaver device 600 may be similarly included in additional interrogation systems using discrete lasers having different wavelength carriers in place of the optical frequency comb source 200.

Figure 7:
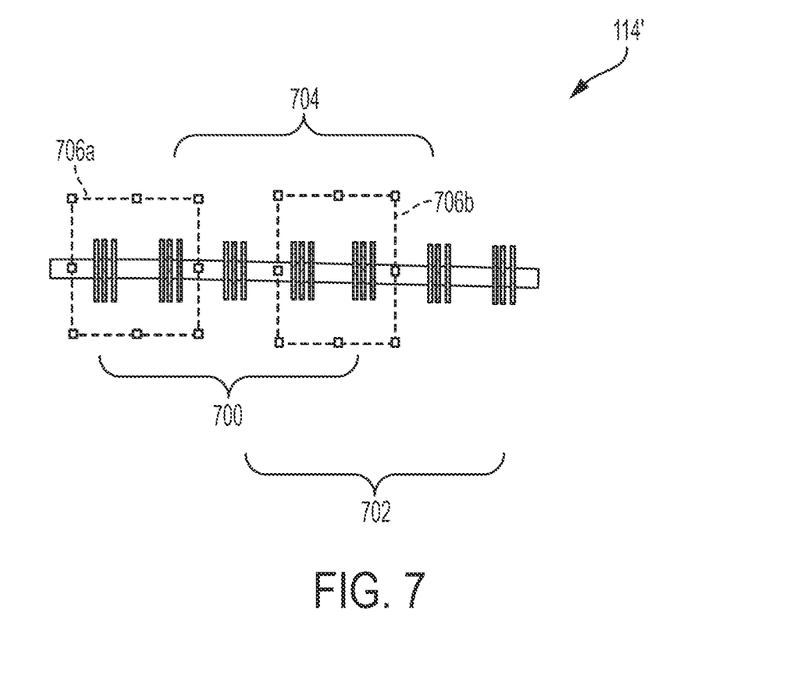
FIG. 7 is a schematic diagram of an example of a fiber-optic cable having an optical sensor array for an interrogation system according to one aspect of the present disclosure.

FIG. 7 is a schematic view of a fiber-optic cable 114' having an optical sensor array for an interrogation system 120 according to one aspect of the present disclosure. In some aspects, the fiber-optic cable may 114' may replace or modify the fiber-optic cable 114' described with respect to FIG. 2. The fiber-optic cable 114' may include sensors 700, 702, 704 having a pair of partial reflectors as described with respect to the sensors 202a-202e of FIG. 2. But, the partial reflectors of the sensors 700, 702, 704 may be densely spaced such that the spacing between each of the partial reflectors coupled to the fiber-optic cable 114' is closer than the width of the sensors 700, 702, 704. In one example, the width of the sensors 700, 702, 704 may be four meters, but the partial reflectors may be separated by one meter or less. In this configuration, the width of the sensors 700, 702, 704 may be based on a rate that the reflected light is sampled by the optical receivers 218 (e.g., optical receivers 218 of FIG. 2). For example, reflected light may be sampled at a rate of 100 MHz, forming a sensor at each meter along the fiber-optic cable 114', where the travel time of the light to a partial reflector and back is ten nanoseconds per meter. But, an interrogation system having a delay fiber (e.g., delay fiber 402 in interrogation system 120B shown in FIG. 4) may include a length resulting in a larger sensor width. For example, the width between the sensors 700, 702, 704 may be ten meters where the delay fiber includes a length of 20 meters (e.g., twice the length of the sensors due to the two-way travel of the light within the fiber-optic cable 114').

In some aspects, the dense spacing of the partial reflectors may mitigate issues such as polarization fading that may affect the signal-to-noise ratio of the sensors 700, 702, 704. For example, if sensor 700 is faded, either of the adjacent sensors may be used as a substitute to capture vibrations occurring with the faded sensor region. In some aspects, the pulse generated by the pulser device 206 may include a width up to the width of the sensors 700, 702, 704 to allow more optical energy to be provided into the fiber-optic cable 114', resulting in more optical energy in the light reflected from the sensors 700, 702, 704 coupled to the fiber-optic cable 114'. In this manner, the reflected light routed to the receiver section of the interrogation system 120 may include a sum of light from multiple reflectors due to the pulse width being wider than the reflector spacing. The functional blocks 706a, 706b represent an example of regions where the partial reflectors of the sensors 700, 702, 704 may provide reflected light for a particular sensor.

Figure 8:
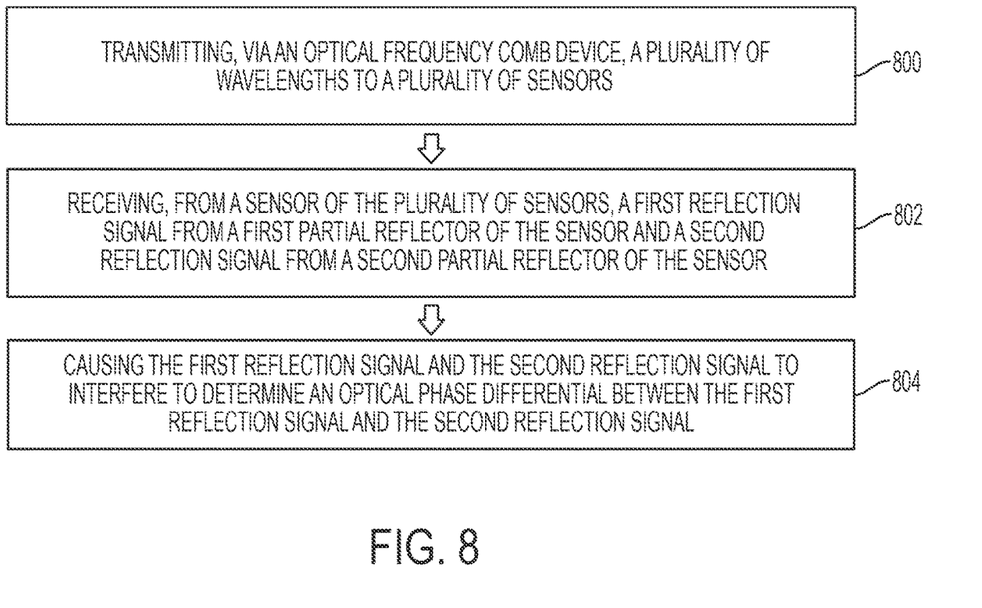
FIG. 8 is a flowchart of an example of a process for interrogating an optical sensor array according to one aspect of the present disclosure.

FIG. 8 is a flowchart showing an example of a process for interrogating sensors 202a-202e using the optical frequency comb source 200. The process is described with respect to FIGS. 2 and 4-6, although additional implementations are possible without departing from the scope of the present disclosure.

In block 800, light signals having different wavelengths are transmitted to the array of sensors 202a-202e. The wavelengths may be transmitted to the array of sensors 202a-202e from the optical frequency comb source 200. For example, the optical frequency comb source 200 may emit light to a signal path coupled to the fiber-optic cable 114 having the sensors 202a-202e. The optical frequency comb source 200 may emit light having multiple, distinct wavelength carriers. The wavelengths optical frequency spacing between the wavelengths may be equal between each of the wavelength carriers emitted by the optical frequency comb source 200. In some aspects, the light emitted from the optical frequency comb source 200 may be applied directly to a pulser device 206 as shown in FIGS. 2 and 4-6. The pulser device 206 may receive the light and generate pulses corresponding to the wavelength carriers from the optical frequency comb sources. The pulses generated by the pulser device 206 may be applied to the sensors 202a-202e via the fiber-optic cable 114 to which the sensors 202a-202e are coupled (e.g., inscribed or externally connected). In one example, a pulse generated by the pulser device 206 may be split into two pulses by a splitter device 406 as shown in FIG. 2. A first pulse may be delayed by the delay fiber 208. A second pulse may be modulated by the optical modulator 210. The delayed pulse and the modulated pulse may be combined using the combiner device 214 and applied to the sensors 202a-202e via the circulator device 216. In a second example, a single pulse generated by the pulser device 206 may be applied to the sensors 202a-202e via the circulator device 216 as shown in FIGS. 4 and 5.

In block 802, reflection signals may be received from the sensors 202a-202e coupled to the fiber-optic cable 114. The reflection signals may be received via the circulator device 216 in a signal path including one or more of optical receivers 218, 218a, 218b shown in FIG. 2 or 4-6 (e.g., a receiver section of the interrogation system 120 coupled to the third port of the circulator device 216). The reflection signals may include at least two reflection signals from a sensor 202a-202e, one reflection signal from each of the pair of partial reflectors 204a-204f making up the sensor 202a-202e. For example, the reflection signals may include a first reflection signal reflected from partial reflector 204a of sensor 202a and a second reflection signal reflected from partial reflector 204b of sensor 202a. In some aspects, the reflection signals may be transmitted back toward the circulator device 216 on a different fiber-optic cable 114 than the fiber-optic cable 114 to which the partial reflectors 204a-204f are coupled. The unidirectional nature of the circulator device 216 may cause the reflection signals to be transmitted to the receiver section of the interrogation system 120 and prevent the reflected light from entering the first port of the circulator device 216 towards the optical frequency comb source 200. In one example, the reflection signals may be received directly by the optical receivers 218 as shown in FIG. 2. In another example, the reflection signals may be received by the optical mixer 400 as shown in FIGS. 4 and 5. In an additional example, the reflection signals may be received by the de-interleaver device 600 as shown in FIG. 6.

In block 804, an interference signal may be generated in the receiver section of the interrogation system 120. The interference signal may be generated using the first reflection signal or the second reflection signal. In some aspects, the interference signal may be generated from the first reflection signal and the second reflection signal causing an interference in the receiver section of the interrogation system 120 (e.g., arriving at the same time). In one example, the first pulse and the second pulse generated by the delay fiber 208 and the optical modulator 210 in FIG. 2, respectively, may include a center separation length equal to twice the separation of the partial reflectors 204a-204f making up the sensors 202a-202e. The center separation length may allow the reflected light from the second pulse returned by a second partial reflector in a pair of partial reflectors 204a-204f to arrive at the optical receivers 218 at the same time as the reflection of the first pulse from the first partial reflector in the pair to create an interference between the reflected light signals. The reflection signals may be combined by the optical receiver 218 to generate an interference signal. In another example, the delay fiber 402 shown in FIG. 4 may delay a reflected light signal from the sensors 202a-202e to cause the delayed light signal to interfere with a second reflected light signal from the sensors 202a-202e at the optical mixer 400. The optical mixer 400 may mix or otherwise combine the light signals to generate an interference signal that may be routed to the optical receivers 218. The optical mixer 400 may mix the light signals in a manner that permits determining the optical phase difference in the light signals. In some aspects, the data processing system 220 may measure the difference in the optical phase of the light signals. The demodulated phase may be used to determine changes in the fiber strain between the pair of partial reflectors 204a-204f. In a third example, the splitter device 500 may route a light signal from the optical frequency comb source 200 directly to the optical mixer 400. The light signal may interfere with a reflected light signal from the sensors 202a-202e at the optical mixer 400 and may be similarly combined to generate an interference signal that may be routed to the optical receivers 218.

In some aspects, the reflected light signals may interfere in the receiver section of the interrogation system 120A' at the de-interleaver device 600 as shown in FIG. 6. The de-interleaver device 600 may create interference signals using the reflected light signals and route the signals to separate groups of optical receivers 218a, 218b. For example, the de-interleaver device 600 may be a single-stage de-interleaver device that may separate the reflection signals received from the sensors 202a-202e based on the wavelength carrier associated with the reflection signals. The de-interleaver device 600 may route one set of reflection signals to the first group of optical receivers 218a having an odd channel of wavelengths (e.g., the first wavelength, the third wavelength, etc.). The de-interleaver device 600 may route another set of reflection signals to a second group of optical receivers 218b having an even channel of wavelengths (e.g., the second wavelength, the fourth wavelength, etc.).

In some aspects, interrogation systems and methods are provided according to one or more of the following examples:

Example #1

An interrogation system may include a plurality of optical sensors coupled to a fiber-optic cable positionable in a wellbore to sense a condition of the wellbore. Each optical sensor of the plurality of optical sensors may include at least two partial reflectors. The interrogation system may also include an optical frequency comb operable to generate a plurality of optical carriers evenly spaced in a frequency. The interrogation system may also include an optical receiver couplable to the fiber-optic cable to receive reflection signals from the at least two partial reflectors of the plurality of optical sensors.

Example #2

The interrogation system of Example #1 may also include a de-interleaver device positionable between the fiber-optic cable and the optical receiver to separate reflections received from the plurality of optical sensors. The interrogation system may also include a second optical receiver couplable to the de-interleaver device to receive the reflections having a first set of wavelength bands separated by the de-interleaver device. The optical receiver may be couplable to the de-interleaver device to receive the reflections having a second set of wavelength bands separated by the de-interleaver device.

Example #3

The interrogation system of Examples #1-2 may also include a pulser device positionable between the optical frequency comb and the plurality of optical sensors to generate a first pulse and a second pulse corresponding to the plurality of optical carriers. The interrogation system may also include an optical modulator device positionable between the pulser device and the plurality of optical sensors to modulate the first pulse. The interrogation system may also include a delay fiber positionable between the pulser device and the plurality of optical sensors to delay the second pulse. The delay fiber may have a length equal to twice a distance between the at least two partial reflectors in each of the plurality of optical sensors.

Example #4

The interrogation system of Examples #1-3 may also include an optical mixer positionable between the plurality of optical sensors and the optical receiver to receive the reflection signals.

Example #5

The interrogation system of Examples #1-4 may also include a delay fiber positionable between the optical mixer and the plurality of optical sensors, the delay fiber having a length that is twice a width of each of the plurality of optical sensors.

Example #6

The interrogation system of Example #4 may feature the optical mixer being couplable to the optical frequency comb to combine a reference signal from the optical frequency comb with the reflection signals.

Example #7

The interrogation system of Examples #1-6 may also include a data processing system couplable to the optical receiver. The data processing system may include a processing device couplable to a database having instructions for causing the processing device to perform interferometric measurements using a signal received from the optical receiver.

Example #8

The interrogation system of Examples #1-7 may feature the plurality of optical sensors including a first sensor having a first pair of partial reflectors and a second sensor having a second pair of partial reflectors. One of the second pair of partial reflectors may be positioned between the first pair of partial reflectors.

Example #9

The interrogation system of Examples #1-8 may feature the plurality of optical sensors including fiber Bragg grating that may be inscribed on the fiber-optic cable and that may be operable to generate the reflection signals. The reflection signals may have differences in phase.

Example #10

An interrogation system may include an optical frequency comb having a plurality of optical carriers evenly spaced to transmit the plurality of optical carriers to a plurality of optical sensors positioned on a fiber-optic cable in a wellbore of a wellbore environment. The interrogation system may also include a de-interleaver device positionable between the fiber-optic cable and at least two optical receivers to separate reflection signals received from the plurality of optical sensors and route the reflection signals to the at least two optical receivers. The interrogation system may also include a data processing system couplable to the at least two optical receivers. The data processing system may include a processing device couplable to a data storage device having instructions for causing the processing device to perform interferometric measurements using a signal received from one of the at least two optical receivers.

Example #11

The interrogation system of Example #10 may feature the at least two optical receivers including first receiver and a second receiver. The de-interleaver device may be couplable to the first receiver to route a first reflection signal having a first wavelength to the first receiver. The de-interleaver device may also be couplable to the second receiver to route a second reflection signal having a second wavelength to the second receiver.

Example #12

The interrogation system of Examples #10-11 may also include a pulser device positionable between the optical frequency comb and the plurality of optical sensors to generate one or more pulse signals corresponding to the plurality of optical carriers.

Example #13

The interrogation system of Examples #10-12 may also include the plurality of optical sensors. The plurality of optical sensors may include fiber Bragg grating inscribed on the fiber-optic cable.

Example #14

The interrogation system of Examples #10-13 may also include a delay fiber having a length that is directly proportional to a width of each sensor of the plurality of optical sensors.

Example #15

The interrogation system of Example #14 may also include an optical modulator positionable between a splitter device and a combiner device to modulate a first optical signal. The delay fiber may be positionable between the splitter device and the combiner device to delay a second optical signal. The de-interleaver device may be positionable to receive a first reflection signal corresponding to the first optical signal and a second reflection signal corresponding to the second optical signal at the same time.

Example #16

The interrogation system of Examples #10 may feature the plurality of optical sensors including a first sensor having a first pair of partial reflectors and a second sensor having a second pair of partial reflectors. One optical sensor of the second pair of partial reflectors may be positioned between the first pair of partial reflectors.

Example #17

A method may include transmitting, via an optical frequency comb source, a plurality of wavelengths from a single light source to a plurality of sensors coupled to a fiber-optic cable. The method may also include receiving, from a sensor of the plurality of sensors, a first reflection signal from a first partial reflector of the sensor and a second reflection signal from a second partial reflector of the sensor. The method may also include generating an interference signal based on the first reflection signal or the second reflection signal.

Example #18

The method of Example #17 may also include separating reflection signals received from the plurality of sensors. The method may also include routing a first set of reflection signals corresponding to a first set of wavelengths of the plurality of wavelengths to a first optical receiver. The method may also include routing a second set of reflection signals corresponding to a second set of wavelengths of the plurality of wavelengths to a second optical receiver.

Example #19

The method of Examples #17-18 may feature generating the interference signal to include combining, via an optical receiver, the first reflection signal and the second reflection signal.

Example #20

The method of Examples #17-18 may further include measuring a difference in phase in the first reflection signal and the second reflection signal. The method may also feature generating the interference signal to include receiving, by an optical mixer, a reference signal of the plurality of wavelengths from the optical frequency comb source. The method may also include combining, via the optical mixer, the reference signal and one of the first reflection signal or the second reflection signal.

The foregoing description of the examples, including illustrated examples, has been presented only for the purpose of illustration and description and is not intended to be exhaustive or to limit the subject matter to the precise forms disclosed. Numerous modifications, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. An interrogation system, comprising:
   a plurality of optical sensors coupled to a fiber-optic cable positionable along an outer surface of a casing string in a wellbore to sense a condition of the wellbore, each optical sensor of the plurality of optical sensors including at least two partial reflectors;
   an optical frequency comb operable to generate a plurality of optical carriers evenly spaced in a frequency;
   a de-interleaver device couplable to the fiber-optic cable to separate optical reflection signals received from the at least two partial reflectors into at least two separate wavelength bands;
   a first opto-electrical device couplable to the fiber-optic cable to receive a first band of the optical reflection signals of the at least two separate wavelength bands and convert the first band of the optical reflection signals into a first electrical signal;
   a second opto-electrical device couplable to the fiber-optic cable to receive a second band of the optical reflection signals of the at least two separate wavelength bands and convert the second band of the optical reflection signals into a second electrical signal;
   a data processing system couplable to the first opto-electrical device and the second opto-electrical device, the data processing system including a processing device couplable to a database having instructions for causing the processing device to perform optical phase measurements on the optical reflection signals using the first electrical signal and the second electrical signal; and
   a plurality of coupling bands extendable around the casing string to secure at least a portion of the fiber-optic cable against the outer surface of the casing string.

2. The interrogation system of claim 1, further comprising:
   a pulser device positionable between the optical frequency comb and the plurality of optical sensors to generate a first pulse and a second pulse corresponding to the plurality of optical carriers;
   an optical modulator device positionable between the pulser device and the plurality of optical sensors to modulate the first pulse; and
   a delay fiber positionable between the pulser device and the plurality of optical sensors to delay the second pulse, the delay fiber having a length equal to twice a distance between the at least two partial reflectors in each of the plurality of optical sensors.

3. The interrogation system of claim 1, further comprising an optical mixer positionable between the plurality of optical sensors and at least one of the first opto-electrical device or the second opto-electrical device to receive the optical reflection signals.

4. The interrogation system of claim 3, further comprising a delay fiber positionable between the optical mixer and the plurality of optical sensors, the delay fiber having a length that is twice a width of each of the plurality of optical sensors.

5. The interrogation system of claim 3, wherein the optical mixer is couplable to the optical frequency comb to combine a reference signal from the optical frequency comb with the optical reflection signals.

6. The interrogation system of claim 1, wherein the plurality of optical sensors includes a first sensor having a first pair of partial reflectors and a second sensor having a second pair of partial reflectors,
   wherein one of the second pair of partial reflectors is positioned between the first pair of partial reflectors.

7. The interrogation system of claim 1, wherein the plurality of optical sensors includes fiber Bragg grating that are inscribed on the fiber-optic cable and operable to generate the optical reflection signals having differences in phase.

8. An interrogation system, comprising:
   an optical frequency comb including a plurality of optical carriers evenly spaced to transmit the plurality of optical carriers to a plurality of optical sensors positioned on a fiber-optic cable along an outer surface of a casing string and a plurality of coupling bands extendable around the casing string to secure at least a portion of the fiber-optic cable against the outer surface of the casing string in a wellbore of a wellbore environment;
   a de-interleaver device positionable between the fiber-optic cable and at least two electro-optical devices to separate optical reflection signals received from the plurality of optical sensors and route the optical reflection signals to the at least two electro-optical devices; and
   a data processing system couplable to the at least two electro-optical devices, the data processing system including a processing device couplable to a data storage device having instructions for causing the processing device to perform optical phase measurements of a signal based on the optical reflection signals received from the plurality of optical sensors and received from the at least two electro-optical devices.

9. The interrogation system of claim 8, wherein the at least two electro-optical devices includes a first electro-optical device and a second electro-optical device,
   wherein the de-interleaver device is couplable to the first electro-optical device to route a first reflection signal having a first wavelength to the first electro-optical device,
   wherein the de-interleaver device is couplable to the second electro-optical device to route a second reflection signal having a second wavelength to the second electro-optical device.

10. The interrogation system of claim 8, further comprising a puller device positionable between the optical frequency comb and the plurality of optical sensors to generate one or more pulse signals corresponding to the plurality of optical carriers.

11. The interrogation system of claim 8, further comprising the plurality of optical sensors, wherein the plurality of optical sensors includes fiber Bragg grating inscribed on the fiber-optic cable.

12. The interrogation system of claim 8, further comprising a delay fiber having a length that is directly proportional to a width of each sensor of the plurality of optical sensors.

13. The interrogation system of claim 12, further comprising an optical modulator positionable between a splitter device and a combiner device to modulate a first optical signal,
- wherein the delay fiber is positionable between the splitter device and the combiner device to delay a second optical signal,
- wherein the de-interleaver device is positionable to receive a first reflection signal corresponding to the first optical signal and a second reflection signal corresponding to the second optical signal at the same time.

14. The interrogation system of claim 8, wherein the plurality of optical sensors includes a first sensor having a first pair of partial reflectors and a second sensor having a second pair of partial reflectors, wherein one optical sensor of the second pair of partial reflectors is positioned between the first pair of partial reflectors.

15. A method, comprising:
- transmitting, via an optical frequency comb source, a plurality of optical frequencies to a plurality of sensors coupled to a fiber-optic cable along an outer surface of a casing string, at least a portion of the fiber-optic cable secured against the outer surface of the casing string by a plurality of coupling bands extending around the casing string;
- separating, using a de-interleaver, optical reflection signals received from the plurality of sensors into a first set of reflection signals corresponding to a first set of wavelengths and a second set of reflection signals corresponding to a second set of wavelengths;
- routing the first set of reflection signals to a first opto-electrical device;
- routing the second set of reflection signals to a second opto-electrical device;
- generating a plurality of interference signals from the plurality of sensors using the first opto-electrical device and the second opto-electrical device, an interference signal based on the optical reflection signals from the plurality of sensors; and
- performing optical phase measurements using the plurality of interference signals.

16. The method of claim 15, wherein generating the interference signals includes combining, via at least one of the first opto-electrical device or the second opto-electrical device, a first reflection signal and a second reflection signal.

17. The method of claim 15, further including measuring a difference in phase in a first reflection signal and a second reflection signal,
- wherein generating the interference signals includes:
  - receiving, by an optical mixer, a reference signal of the plurality of optical frequencies from the optical frequency comb source; and
  - combining, via the optical mixer, the reference signal and one of the first reflection signal or the second reflection signal.

18. The interrogation system of claim 1, further comprising a protective covering installable over the fiber optic cable at a coupling of the casing string.

19. The interrogation system of claim 8, wherein the plurality of optical sensors include partial reflectors spaced apart less than a width of an optical sensor among the plurality of optical sensors, the width of the optical sensor based on a sampling rate for the optical phase measurements.

20. The method of claim 15, further comprising spacing apart partial reflectors of the plurality of sensors less than a width of a sensor among the plurality of sensors, the width of the sensor based on a sampling rate for the optical phase measurements.

* * * * *